United States Patent [19]

van Haaften

[11] 4,267,857
[45] May 19, 1981

[54] DUCT SYSTEM CONTAINING A MOVABLE PLUG BODY

[76] Inventor: Henry M. T. van Haaften, Aquamarijnstraat 793, Groningen, Netherlands

[21] Appl. No.: 78,673

[22] Filed: Sep. 25, 1979

[51] Int. Cl.³ .............................................. A01G 27/00
[52] U.S. Cl. .................................. 137/119; 137/268; 137/624.2; 239/66
[58] Field of Search ................... 137/119, 268, 624.18, 137/624.2; 239/66; 15/104.06

[56] References Cited

U.S. PATENT DOCUMENTS 4,085,769  4/1978  van Haaften ........................ 137/268

FOREIGN PATENT DOCUMENTS 2088763  1/1976  France ................................. 137/119
2304843  10/1976 France ................................. 137/119

Primary Examiner—Alan Cohan
Attorney, Agent, or Firm—Diller, Ramik & Wight

[57] ABSTRACT

A plug body is moved through a duct system by a pressure differential across the plug body. Cooperating members between the duct system and plug body retain the plug body at a number of different locations. The plug body is released from each of such locations by increasing the pressure differential across the plug body.

37 Claims, 10 Drawing Figures

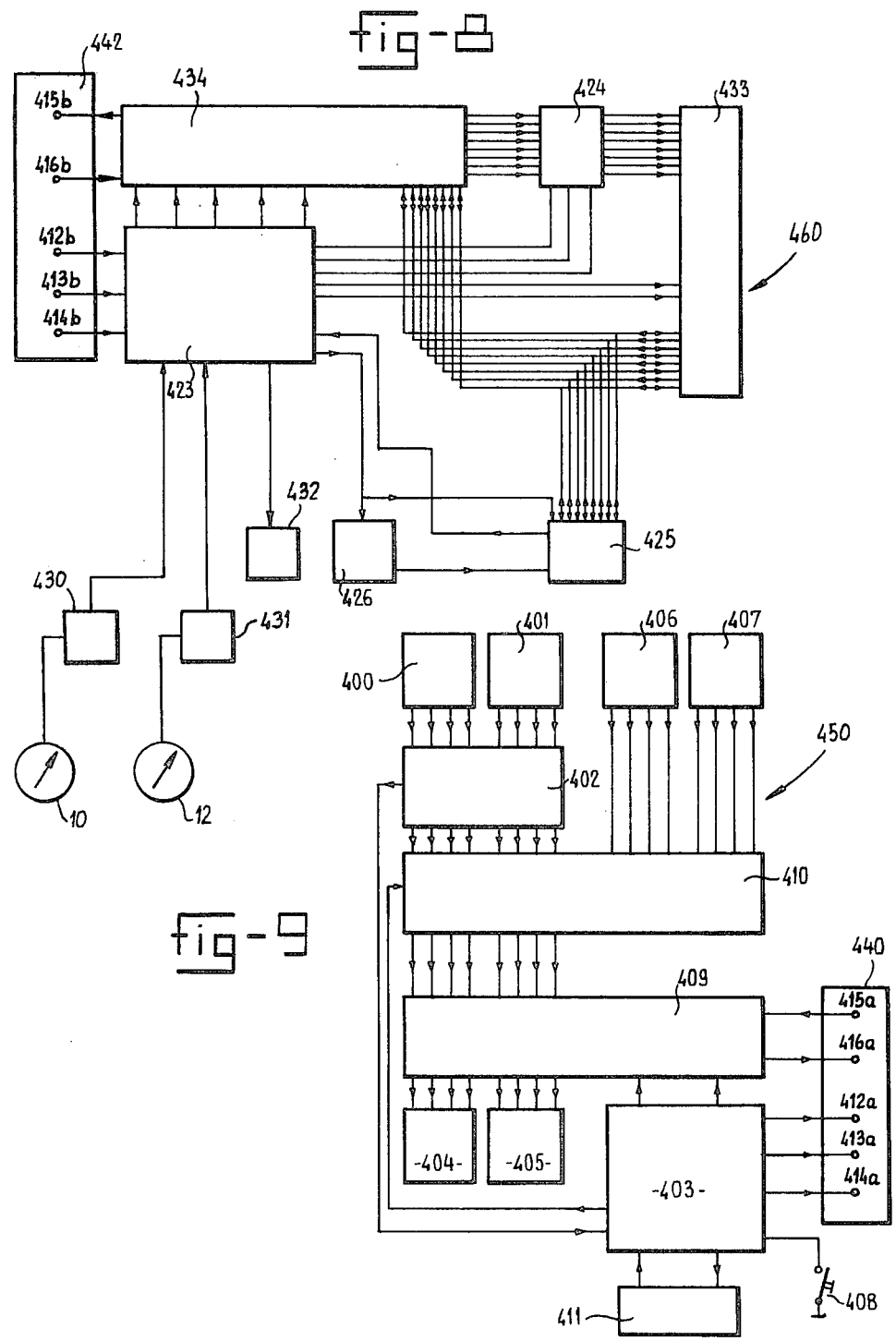

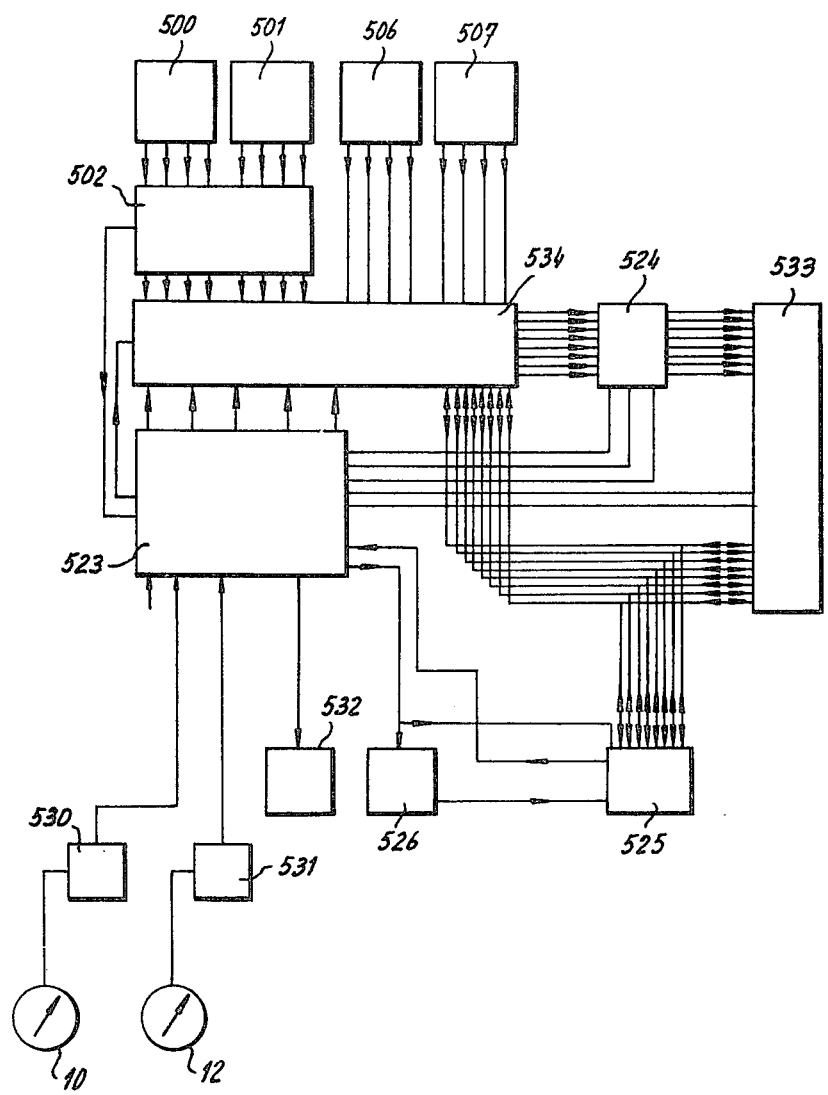

DUCT SYSTEM CONTAINING A MOVABLE PLUG BODY

This invention relates to a duct system for a fluid adapted to move a plug body through a duct under control of the fluid pressure difference between up- and downstream thereof, which plug body and which duct have mutually cooperating means to retain the plug body in a number of subsequent positions in said duct.

In U.S. Pat. No. 4,150,685 by the inventor, such a system is indicated, having control means in the plug body, which may be programmed to give any required retention time in any station in the duct. In such systems there is a considerable amount of freedom in this respect, that the retention times for each valve station can be freely chosen and changed if necessary.

It is an object of the present invention to provide such a system, which is better suited for use with viscous, polluted or granular fluids.

It is a further object of the invention to provide such a system which is highly reliable in use, simple in structure and thus of relatively low cost, and which can easily be inspected and repaired.

It is moreover an object of the invention to provide such a system having a relatively small inner diameter of the duct, which duct may have sharp curves and bends.

In view thereof the duct system as given in the preamble is, according to the invention, mainly characterized in that means are provided to temporarily increase the pressure difference between the fluid pressure upstream of the plug body and the fluid pressure downstream of the plug body, which increased pressure difference is made to operate on the mutually cooperating means to release the retained plug body after a certain retention time in one of said subsequent positions to allow the plug body to move to the next one of said subsequent positions by the fluid.

In this new system a very simple plug body may be used and furthermore an immediate variation of the retention time to any required value is possible for any desired station in the duct.

The increase of said pressure difference can be realized in various ways, e.g. by effecting the drive means of a fluid pump by control and switching means such that the pump temporarily discharges at a higher pressure, or by decreasing the resistance of flow of fluid from a source such as a common supply duct into the duct to increase the pressure therein. It is also possible instead thereof or additionally thereto to temporily apply a suction to the fluid downstream of the plug body in the duct.

The retaining means may include a narrowed section in the duct at each position where the plug body should be retained and the plug body may have a radially compressible part cooperating with said section in the duct or be radially compressible as a whole.

The invention moreover relates to several preferred embodiments of such systems and of parts thereof. Moreover, the invention relates to embodiments of the station wherein the plug body is retained and to the application of the invention to leak detection systems.

The invention will now be explained in more detail with reference to the attached drawings showing several preferred embodiments of duct systems and parts thereof according to the invention. In said drawings:

FIGS. 8 and 9 show a first embodiment of a control unit and a programming unit respectively.

FIG. 10 shows an embodiment of a combined control and programming unit.

Figure 1:
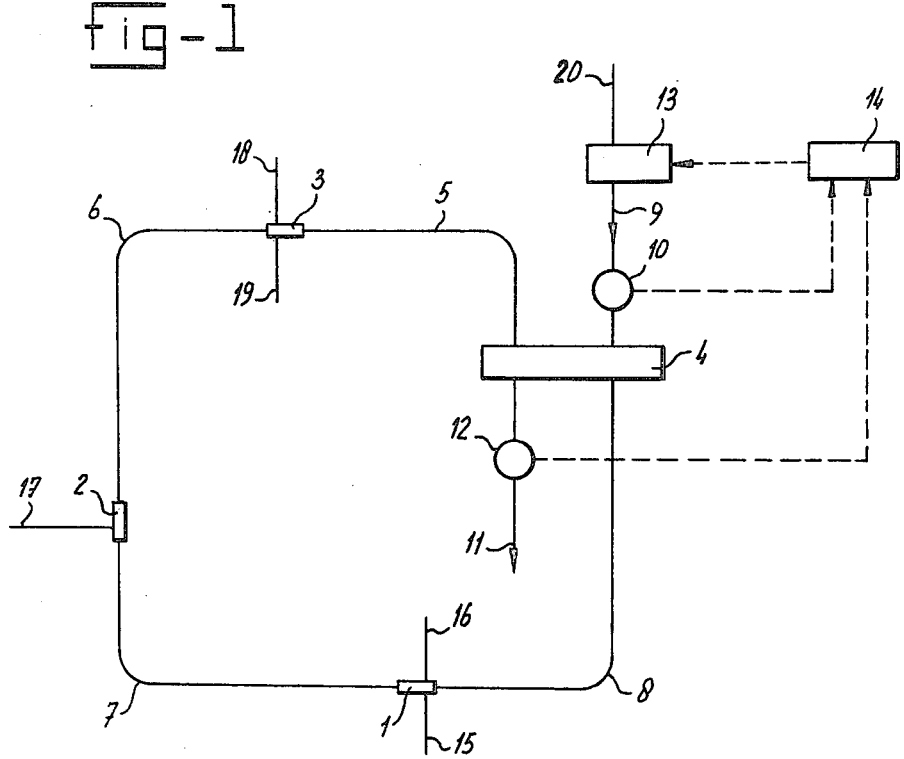
FIG. 1 shows a diagrammatic view of a first embodiment of a distribution system according to the invention.

FIG. 1 shows a diagrammatic view of a ring duct system comprising the retaining stations 1, 2 and 3 and the transfer station 4 interconnected by the ring duct sections 5, 6, 7 and 8, and furthermore a supply duct 9 connected to the transfer station 4 and a drain duct 11, also connected to the transfer station 4. At each of the retaining stations one or more distribution ducts 15, 16, 17, 18, 19 are connected to the ring duct comprising distribution valves to open or close said distribution ducts.

A fluid such as water is supplied to the ring duct system from a central supply duct 20. The pressure in the supply duct 9 is determined by the pump 13, controlled by the control unit 14. Said control unit 14 receives signals from the flow meters 10 and 12 positioned in the supply duct 9 and in the drain duct 11 resp.

Figure 3:
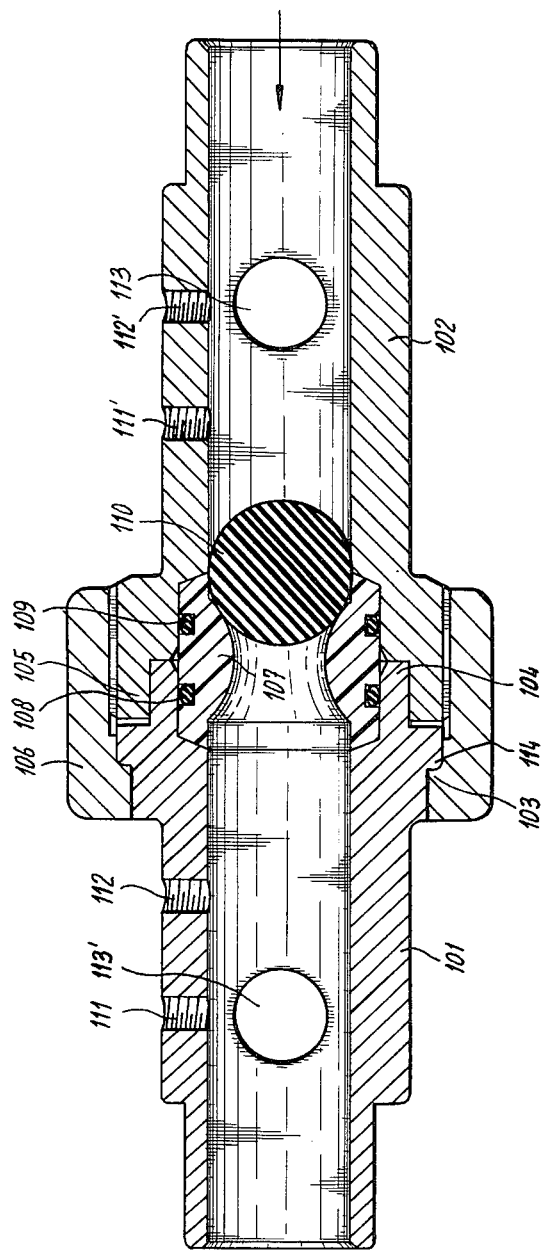
FIG. 3 shows a sectional view through the main duct of the system in one station with the plug body retained in said station.

A plug body, an embodiment of which is shown in more detail in FIG. 3, is pumped through the ring duct by the fluid displaced by pump 13, which plug body will be retained in each of the stations during a predetermined retention time for operating the valves in the corresponding distribution duct to discharge water during said predetermined retention time of the plug body in said station.

At the downstream end of the ring duct the plug body reaches the transfer station 4 wherein the plug body is moved to the upstream end of the ring duct system (duct section 8) to start another passage through the ring duct system.

Figure 2:
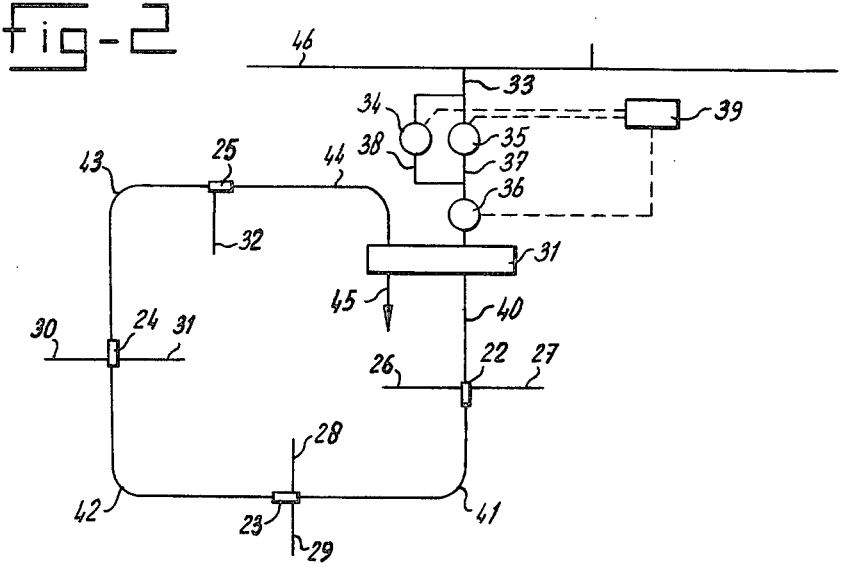
FIG. 2 shows a diagrammatic view of a further embodiment of a distribution system according to the invention.

In FIG. 2 a ring duct system is shown, connected to a central supply duct 46. Further such ring duct systems, not shown, may be connected to the same duct 46 and each of said ring duct systems can be controlled by a separate control unit such as 39.

The ring duct system shown in FIG. 2 comprises the retaining stations 22, 23, 24 and 25 with distribution ducts 26 to 32, one or two of which being connected to the ring duct at each station 22 to 25 as shown. The retaining stations 22 to 25 are interconnected by means of the ring duct sections 40, 41, 42, 43 and 44. The upstream end of ring duct section 40 and the downstream end of ring duct section 44 are connected to the transfer station 31. Furthermore a drain duct 45 is connected to said transfer station 31. A fluid such as water is supplied from the central supply duct 46 through the supply duct 33 which is branching into a first branch duct 37 with the adjustable flow restricting valve 35 and a second branch duct 38 with the valve 34, being e.g. electromagnetically operated valves of commercially available type. The output sides of both branch ducts 38 and 37 are combined and coupled to a pressure meter 36, the downstream connection of which is connected to the transfer station 31.

The valves 34 and 35 are controlled through signal lines by the control unit 39 receiving signals from the pressure meter 36 and transmitting control signals to the valves 34 and 35. The functioning of this ring duct system will be described in more detail afterwards. The valves 34 and 35 may be replaced by pumps, in particular for a wide ring duct and high quantities of fluid to be discharged at the stations per unit time. Pump 35 may then be controlled to vary the quantity of fluid pumped into the ring duct.

Said control may be continuous in a wide range or in steps. Pump 34 may have a valve only opening or closing its duct and may be operated at one speed only, to give enough pressure in the ring duct to push a plug body from a retaining station. Both pumps may suck from any source also other than a duct 46.

As shown in FIG. 3, a retaining station consists of two cylindrical elements 101 and 102, having cylindrical extensions 104 and 105, fitting one around the other and coupled by a sleeve 106, engaging behind shoulder 114 with part 103 and being internally screw-threaded to engage element 102.

Both elements 101 and 102 are taken up through screw-threaded connections not shown in and as parts of the ring duct sections 5 to 8 of FIG. 1 or 40 to 44 of FIG. 2, forming an internal passage with an inner diameter corresponding to the inner diameter of the ring duct. Furthermore, said elements 101 and 102 define a recess with enlarged diameter for taking up a ring-shaped element 107 with at least partially smaller diameter than the diameter of said ring duct. Said element 107 is consigned for retaining the plug body 110 as illustrated in FIG. 3. Sealing rings 108 and 109 avoid leakage.

In FIG. 3 an embodiment of the plug body 110 is shown, consisting of a ball shaped element from a suitable resilient material, for instance rubber, e.g. a laminate of rubber and reinforcing layers of fabric of the like. The diameter of said rubber ball is about the same as the diameter of the ring duct so that said ball can move through the ring duct under the influence of the fluid pressure. As soon as the ball enters the retaining station illustrated in FIG. 3, coming from the direction indicated by the arrow, the ball will be stopped by the ring shaped element 107, thus closing the ring duct. Each cylindrical element 101, 102 has two screw-threaded bores 111 and 112, 111' and 112' to be connected to control ducts to be described below, and also connections for distribution ducts opening at 113 and 113'. Instead of being a compressible ball 110 the plug body may be of rather hard and incompressible material cooperating with a ring shaped element 107 consisting of resilient compressible material or having its part with smaller diameter only made of such material.

Figure 4:
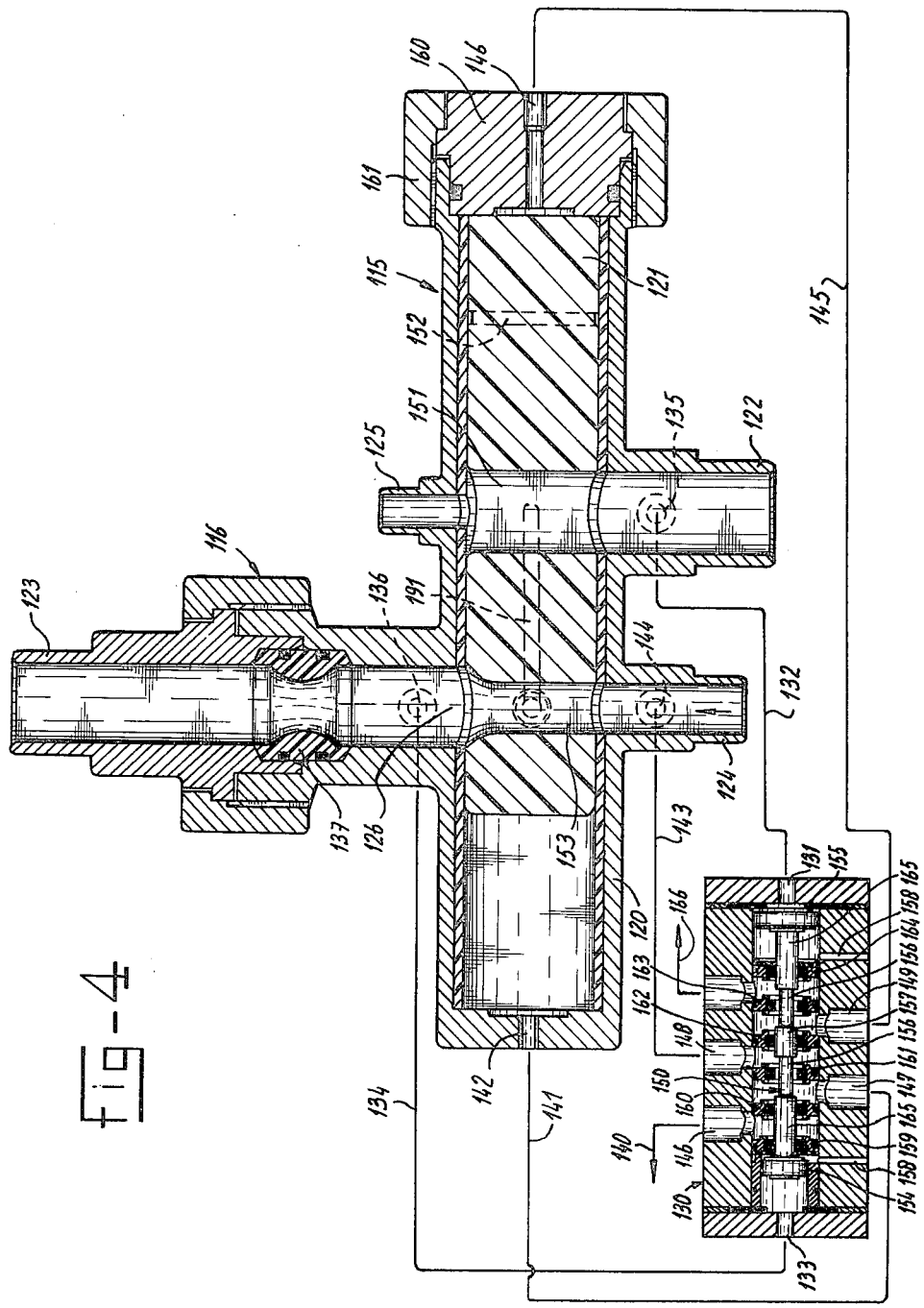
FIG. 4 shows a first embodiment of a transfer station for use in the distribution system according to the invention.

FIG. 4 shows an embodiment of a transfer station 115 for use in a ring duct system to transfer the plug body from the downstream end of the ring duct to the upstream end thereof. The transfer station 115 comprises an elongated housing 120 in which a sliding block 121 is movable from a left hand to a right hand position vice versa, controlled by the plug body and by a valve assembly 130. The downstream end of the ring duct system such as duct section 5 in FIG. 1 and 44 in FIG. 2 is connected to pipe connector 122. The upstream end of the ring duct system such as duct section 8 in FIG. 1 and 41 in FIG. 2 is connected to the pipe connector 123. The supply duct for the fluid such as water from a source such as the pump 13 in FIG. 1 or from the duct 46 in FIG. 2 is connected to pipe connector 124, the centre line of which is in line with the centre line of the discharge bore 126. The fluid drain duct (11 or 45 in FIGS. 1 and 2 resp.) is connected to pipe connector 125, the centre line of which is in line with the centre line of pipe connector 122.

As is shown in FIG. 4 a retaining station at 116 is positioned between said pipe connector 123 and the discharge bore 126. A retaining member 137 resembles the retaining member 107 illustrated in FIG. 3.

At the left hand side in FIG. 4 the end wall of housing 120 has a bore 142. The right hand side of the housing 120 is closed by means of a suitable stop element 160 with a bore 146 and a ring nut 161. The sliding block 121 contains two bores 151 and 153 and a circumferential groove 152. Measured in the transverse direction the distance between the centre lines of the bores 151 and 153 equals the distance between centre line of the bore 151 and centre circle of the groove 152 and also equals the distance between the centre lines of the pipe connectors 124 and 122. In the left hand position of the sliding block 121 the centre lines of bore 151 and pipe connector 124 are in line and in the right hand position of the sliding block 121, as shown in FIG. 4, the centre lines of bore 151 and pipe connector 122 are in line.

The valve 130 comprises a valve housing in which a stepped piston valve body 150 can move between a left hand position and a right hand position. The bore 131 at the right end of the valve housing is connected by means of a control duct 132 to an opening 135 in the downstream connector 122 of the transfer station. The bore 133 at the left hand side of the valve housing is connected by means of a control duct 134 to an opening 136 in the discharge section of the transfer station between the transfer station and the retaining station at 116. The valve 130 controls the connections between five different ducts. Duct 140 functions as a drain duct; control duct 141 is connected to bore 142; control duct 143 is connected to an opening 144 in the fluid supply connection 124; control duct 145 is connected to bore 146 in the stop element 160 at the right hand side of the transfer station housing; duct 166 also functions as a drain duct.

At the valve 130 the ducts 140, 141, 143 and 145 are connected to the bores 146, 147, 148 and 149 respectively. The valve body 150 contains two pistons 154 and 155 at its ends, piston 154 being of smaller diameter. These pistons are connected by a piston rod having thicker parts 165, thinner parts 156 and a central dam 157. The dam 157 has the same diameter as the thicker parts 165. Openings 158 connect the spaces in the valve housing to the right of piston 154 and to the left of piston 155 to atmosphere. The housing 162 has dams 159, 160, 161, 162, 163 and 164 at mutually equal distances and having inner openings so that they may sealingly engage around the thicker parts 165 and the dam 157.

In the right hand position of the valve body 150 as shown, the ducts 141 and 143 are interconnected around dam 161, the duct 140 is closed and the duct 145 is open to atmosphere through drain 166.

A keyway 191 in the outer wall of sliding block 121, into which engages a pin or bolt end in housing 120 (shown behind bore 153) warrants the correct angular position of block 121 if it is circular in cross-section. It may be preferred to choose another shape of this cross-section.

At the end of its passage through the system the plug body enters bore 151 of the transfer station through the downsteam connector 122, and moves on in the sliding block 121 until it closes the drain connection 125. This causes a rise of pressure of the fluid upstream of the plug body, which is transmitted through control duct 132 to the bore 131, which causes the piston 155 and thus the entire valve body 150 to move from the right hand to the left hand position, thereby interconnecting the ducts 140 and 141 and the ducts 143 and 145. The pressure in the fluid supply connection 124 is now transmitted through duct 143 to duct 145 and thus to bore 146, causing the sliding block 121 to move from the right hand to the left hand position. As the sliding block 121 reaches the left hand position, the downstream connection 122 is connection to drain connection 125 by grooves 152, causing a pressure drop also in duct 132. Moreover, the bore 151 comes in line with the fluid supply connection 124 and with the discharge bore 126, so that the plug body will start moving into said bore up to retaining element 137 under influence of the pressure in the fluid supply from 124.

The retaining of the plug body by the retaining element 137 will cause a pressure rise upstream of the plug body, which is transmitted by means of the control duct 134 to the left hand side of the valve body 150, causing the valve body 150 to move to the right hand position pushing out fluid in front of the right hand side of piston part 155 through bore 131 and 132, connection 135, groove 152 and drain 125. This causes closing of the ducts 140 and 145 and connecting of the ducts 141 and 143. Thereafter the pressure in the fluid supply duct will be transmitted from the fluid supply connection 124 through the control duct 143 and the control duct 141 to the bore 142 causing the sliding block 121 to move in the transfer station housing to the right hand position. As soon as the sliding block has reached this position, no more fluid is withdrawn to move it. The pressure in the fluid supply duct 124 will thus show a rise detected by the pressure meter 36 of FIG. 2, or the absence of flow is detected by flow meter 10 of FIGS. 1, and this is signalled to the control unit 14 or 39 in FIG. 1 and 2 resp., which is thereby reset. The pressure, to which the plug body is now exposed, may in itself be sufficient to push the plug body through the retaining element 137 or the control unit may now generate a pressure pulse into the fluid supply duct to release the plug body from the retaining element 137, so that the plug body will move to the next retaining station. The valve body 150 may have arresting means to keep it safely in its extreme positions, and a spring biassing it to the left if desired, but the difference in diameter between pistons 154 and 155 will often be enough to reliably move it to the left in the described pressure situation.

Figure 5:
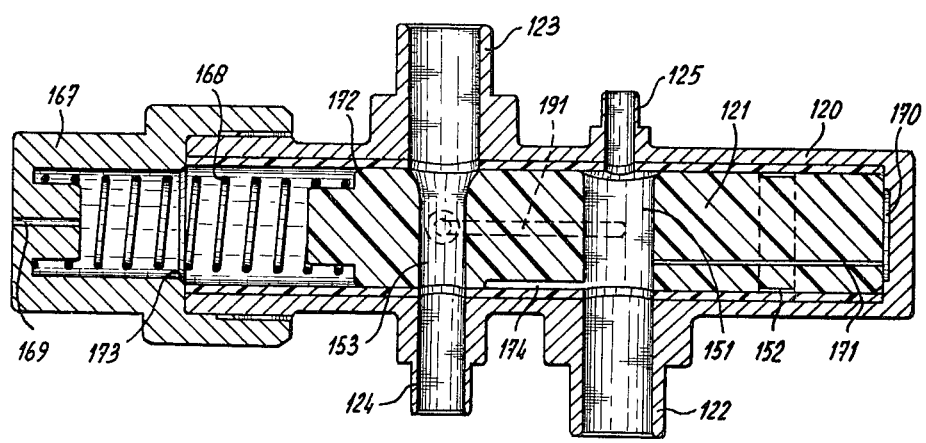
FIG. 5 shows a second embodiment of a transfer station for use in the distribution system according to the invention.

FIG. 5 shows another embodiment of such a transfer station, containing in essence the same parts and connections as the transfer station of FIG. 4 indicated by the same reference numerals. There is no retaining station like 137 no valve like 150 in FIG. 4. The right hand side of the housing 120 is closed by an integrally formed end wall containing a recess 170. The left hand side of the housing 120 is closed by a cap 167. A compression coil spring 168 is mounted between said cap 167 and the sliding block 121. The cap 167 contains a drain bore 169.

A narrow bore 171 extends from the bore 151 to the right hand side of the block 121 opening into the recess 170. The throttling of bore 171 may be constituted by or supplemented by a throttling opening, if desired taken up in an adjustable needle valve. Furthermore a longitudinal groove 174 along the surface of block 121 opens into bore 151 and extends in the direction of bore 153 to a point close thereto.

The operation of this transfer station differs from the operation of the station of FIG. 4 in the following respects. The pressure upstream of the plug body present in bore 151 is transmitted through bore 171 to the recess 170 causing the sliding block to move leftwards. At the time the right edge of bore 151 passes the left edge of the opening of connection 122 the groove 174 is in communication with connection 124, so that the fluid pressure is transmitted through connection 124, groove 174, bore 151 and bore 171 to recess 170, so that the leftward movement of said block 121 continues, until the left shoulder 172 of said block 151 contacts seat 173 of cap 167. In this position the plug body will be pressed out of the sliding block 121 into the upstream end of the ring duct section at 123, causing a decrease of pressure. This also gradually decreases the pressure to the right of block 121 through bore 171. The compressed coil spring 108 thus starts moving the block 121 back to the right.

For a description of FIG. 6 it is first again referred to FIG. 3 showing a retaining station for the plug body and having bores 111, 111',112 and 112' to be connected to control ducts and distribution ducts opening at 113 and 113'.

Figure 6:
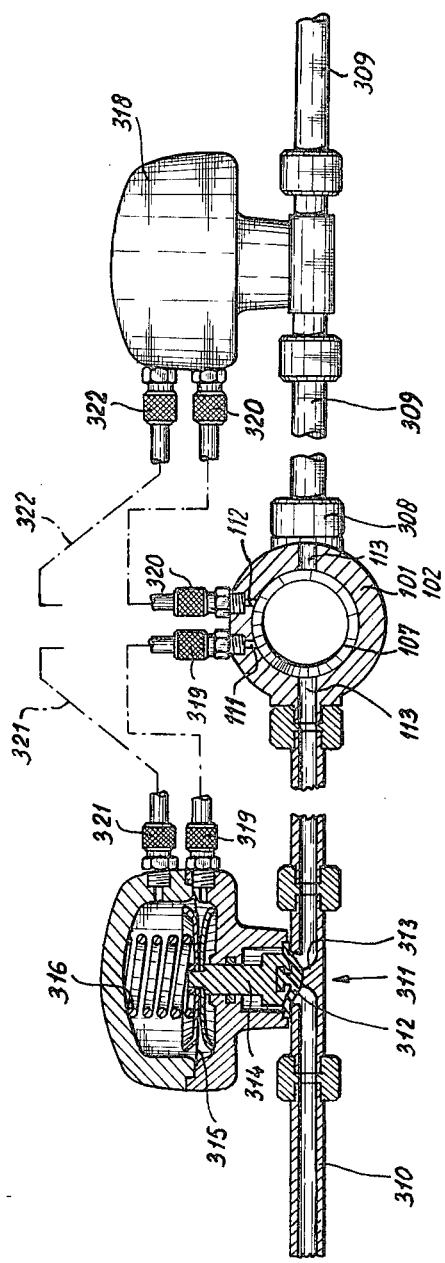
FIG. 6 shows an embodiment of a station with two distribution valves in a distribution duct operated when the plug body is retained in the related station.

In FIG. 6 the bores 111 and 112 of FIG. 3 are, for sake of clarity, assumed to lie one to the side of the other in the same plane perpendicular to the axis of ring duct parts 101, 102. The opening 113 of the distribution duct in FIG. 3 is in FIG. 6 also shown in the same plane of the drawing. Acutally, it is positioned at the other side of the narrowed retaining body 107 of FIG. 3 as will be clear from said Figure. This opening 113 is connected to a distribution duct 310 having a diaphragm valve 311. Opposite duct 310 there may be a similar duct 309 connected at 308 to the ring duct 301 and having a similar valve 318, which parts are shown in elevation only but are similar to duct 310, to connection at 113 and to valve 311. The valves 311 and 318 are shown as diaphragm valves of a commercially available type having a diaphragm 312 adapted to be seated on a dam 313 in the duct and movable up and down by a stem 314 operated by a sping loaded diaphragm 315. The loading spring 316 is biassing the diaphragm 315, the stem 314 and the diaphragm 312 downwards so as to keep the valve 311 (and also 318) closed if no other steps are taken.

The distribution ducts 309 and 310 correspond to ducts 15 to 19 in FIG. 1 and 26 to 32 in FIG. 2. Bore 111 in FIG. 6 connects duct 319 to the casing of valve 311 below the diaphragm 315, and bore 112 connects duct 320 to the casing of valve 318 below the diaphragm therein. In this case there are also two further bores (111' and 112' in FIG. 3) near the upstream end of the retaining station and of these bores one is communication with duct 321 opening above diaphragm 315 in the casing of valve 311 and the other such bore is in communication with duct 322 opening in the casing of valve 318 above the diaphragm therein. Before the plug body enters the retaining station, or just after its passage therethrough, the pressure in the control ducts 319 and 322 is substantially the same, being either the lower pressure downstream or the higher pressure upstream of the plug body in the ring duct. The valves 311 and 318 will thus be closed by means of the biassing springs 316. As soon as the plug body 110 is retained in the related retaining station (by 107, FIG. 3) the pressure at the upstream side will rise resulting in a pressure difference over the diaphragm in each of the valves 311 and 318 causing said valves to open to allow fluid such as water to flow through the discharge ducts 309 and 310.

Figure 7:
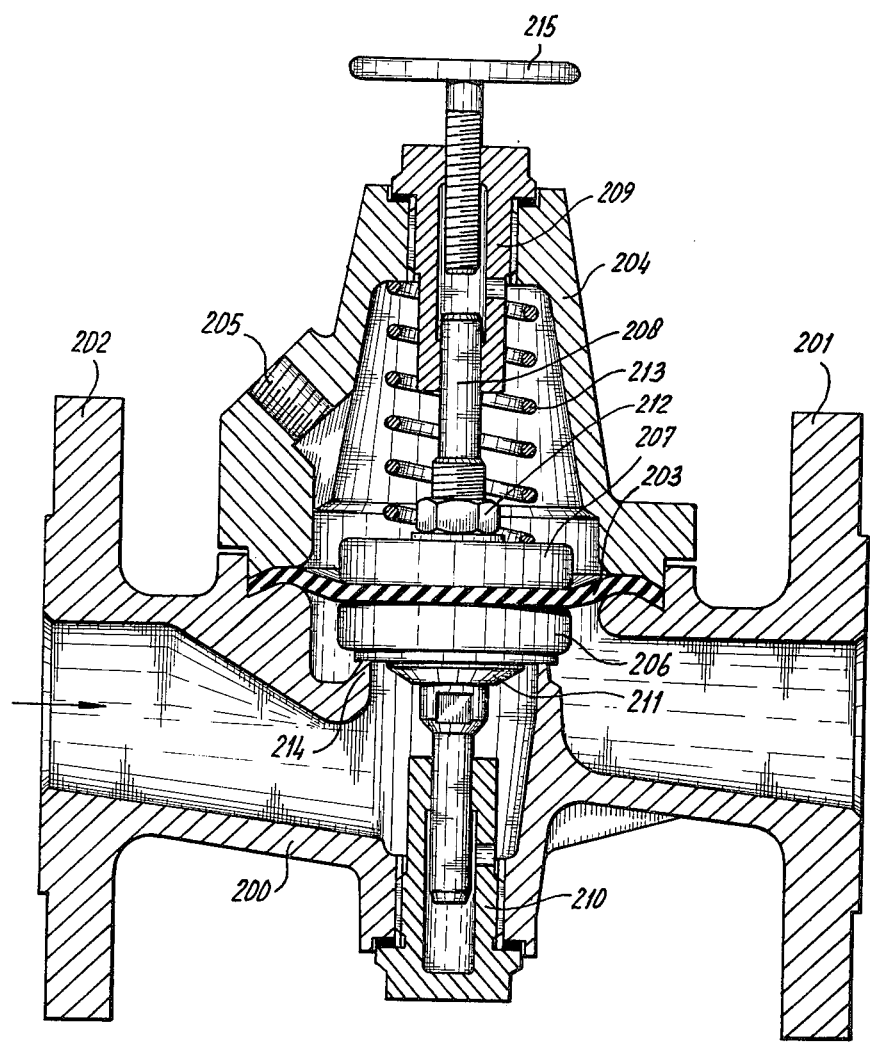
FIG. 7 shows a further embodiment of a distribution valve.

FIG. 7 illustrates a possible other embodiment of a distribution valve used in the distribution ducts, particularly suited for irrigation purposes. Said valve comprises a housing 200 with flanges 202 and 201 at both ends to take up said housing in a distribution duct. A resilient diaphragm 203 is fitted between the housing 200 and a generally cup-shaped housing section 204. Said diaphragm 203 is maintained between two disk-shaped elements 206 and 207 secured to a stem 208, for instance by a nut 212 cooperating with a screw-threaded section on the stem 208 above the diaphragm 203 and a shoulder element 211 below it. Said stem 208 is slidable in cylindrical hollow guide elements 209 and 210. A coil spring 213 between the top end portion of the housing section 204 and the upper disk element 207 biasses the diaphragm 203 downwards, onto the valve seat portion 214 of the housing 200, thereby closing the distribution duct. The cup-shaped housing section 204 furthermore contains a bore 205 for connecting the valve 200 to a control duct, the other end of which is connected to a control bore 111 or 112 at the related retaining station (FIG. 3). In this case the bores 111' and 112' of FIG. 3 are not necessary. A hand wheel operated flow control screw spindle 215 limits the upward movement of the stem 208 and thus the maximum opening of the valve adjustably.

As long as the pressure at the input side of the distribution duct, at the side of flange 202, equals the pressure in the control duct connected to the opening 205, the valve remains closed. However, as soon as a pressure difference is developed between the pressure at the input side of the valve and the pressure in the control duct such that the pressure at the input side of the valve is relatively higher than the pressure in the control duct, which is caused by the entry of the plug body 110 into the retaining station and its retaining by part 107 (FIG. 3), the valve will open so that the fluid such as water will flow through the distribution duct.

Many other types of valves such as butterfly valves, ball valves and slide valves, whether or not operated directly or indirectly by the fluid pressure, through diaphragms, pistons, racks and pinions etc. may be used.

The fluid admitted to a distribution duct may be discharged by any suitable means depending on the purpose of the system. For irrigation purposes this fluid may e.g. not only be discharged through spray nozzles but also be used to move such nozzles into an operative position, such as for pop-up sprinklers for lawns known as such.

Instead of transfer stations of a type shown in FIGS. 4 and 5, the system may be embodied so as to move the plug body to and fro. This may be done by hand or automatically, by a simple fourway valve structure allowing switching of the supply from the pump or other source from one end of the ring duct to the other end and switching of the drain of fluid from the ring duct upstream of the plug body from said other end of the ring duct to the first-mentioned end.

The retaining station of FIG. 3 is immediately suited for use with such a system, by choosing either control duct connections 111 and 112 with distribution duct opening 113 or control duct connections 111' and 112' with distribution duct opening 113'. Each distribution duct may then have a valve such as given in FIG. 7. When applying valves as shown in FIG. 6, with distribution duct 309 connected to opening 113 and distribution duct 310 connected to opening 113', control duct 319 will be connected to duct connection 111, control duct 321 to duct connection 111' (as in FIG. 6), control duct 320 will be connected to duct connection 112' and control duct 322 to duct connection 112.

Instead of retaining stations of a type shown in FIG. 3, stations may be used as shown in FIG. 2 and 3 of U.S. Pat. No. 4,150,685 by the same applicant, in which the plug body is retained in a station by a sleeve, which is moved by the fluid pressure on the plug body in the station against spring action to immediately open an outlet duct such as a fluid distribution duct opening in the ring duct.

The system of FIG. 1 may be used to determine possible leakage of the ring duct system, with or without the possibility of a discharge of fluid at the retaining stations. If there are such discharge possibilities at the stations, they or the discharging means from the distribution ducts may be closed, e.g. by hand, for measuring leakage. The flow meters 11 and 12 will have a measuring range so as to be sensitive to very small quantities of fluid.

The plug body is moved in the manner described to the first station 1, where it is retained. The pressure upstream thereof is now controlled to a predetermined value by the control unit 14. If there is no leakage, flow meters 11 and 12 will not show a reading. If there is leakage along the plug body in the retaining station, meters 11 and 12 will show the same positive reading, apart from tolerances. If there is leakage from the duct system between the pump 13 and the plug body in the station 1, meter 11 will show a positive reading (or a higher reading than meter 12) and this reading (or the difference thereof with the reading of meter 12) is a measure for the leakage in this part of the duct system (duct section 8).

By an increase of pressure as described, the plug body is then moved to station 2 and the same operation as to pressure and reading is repeated, showing the leakage in the system over ring duct parts 7 and 8. By subtracting the leakage over duct station 8 therefrom, the leakage over duct part 7 is found. This may be repeated for all retainin stations. The readings for all stations may be stored in a memory and they themselves or the leakage quantities derived therefrom may be shown on a display or by a printer at any desired moment. For a good comparison, the pressure in the duct should be kept at the same level, during each measurement independent on the station where the plug body is retained.

The control of the plug body will now be described in more detail, first referring to FIG. 1.

When the plug body has to be moved through the duct system, the pump is operated at a first, lower and fixed speed. All the distribution valves such as 311 and 318 of FIG. 6 and 200 of FIG. 7, in the distribution ducts, controlled by the retaining stations, are closed.

Assuming that there is no leakage in the system, the amount of fluid supplied through the supply duct 9 per unit of time upstream of the plug body is also discharged through the drain duct downstream of the plug body. If the meters 10 and 12 are flow meters, the reading of both flow meters will be identical except for some inaccuracy in both measurements, for instance caused by meter tolerances.

When the plug body (110 of FIG. 5) enters one of the retaining stations, it will be retained, the flow meters 10 will show this, causing switching of the pump drive to a higher speed, power and pressure, thereby opening the distribution valve or valves assigned to the concerning station, so that fluid can be discharged through the discharge duct(s) connected to said valve(s).

Suppose the amount of fluid to be discharged through said discharge duct is a. Suppose furthermore that meter 10 indicates that the amount of fluid delivered through the supply duct 13 is b and the meter 12 indicates that the amount of fluid flowing through the drain duct 11 (because of leakage) is c. Thus, the amount of fluid delivered through said discharge duct is b−c. As soon as or just before b−c=a, the control system, which will hereafter be described in more detail, will initiate a temporary increase in the pressure of the fluid upstream of the plug body from said station to continue its course through the duct to the next station.

As already remarked above, during the movement of the plug body through the duct system the reading of both meters 10 and 12 will be identical except for a small difference caused by meter tolerances and perhaps by some leakage. To eliminate the influence of said tolerances the control system will only detect the entering by the plug body of the next station when the indication of the amount of fluid supplied through the supply duct 9 and the indication of the amount of fluid drained through the drain duct 11 show a difference exceeding a predetermined level d. programmed in the control unit. That means that at the moment that b−c exceeds d the plug body has entered a station and a distribution duct has opened. At that moment the control system will start to measure the amount of fluid delivered through the discharge duct(s) at said station, which will be described in more detail below.

In view of differences between the stations as to resistance of distribution ducts, valves, possible spray nozzles, etc. and as to the desired quantity of fluid to be discharged per unit time, a control unit such as 14 or 39 (FIGS. 1 and 2) may operate the pump or adjust a restricting valve such as 35 in FIG. 2 in such a way that this is taken into account.

Moreover, during discharge, the fluid pressure at a station is not the same as the pressure at the discharge of the pump or other supply means and will differ therefrom by an amount which is not the same for all stations, due to differences in quantity of flow per unit time and duct length from the pump to the concerning discharge station. The control system to be described may be adapted to take up all such differences. The valves according to FIGS. 6 and 7 may have means to easily adjust the spring pressure on their diaphragms and adjustable means for limiting their maximum opening movements, such as the flow control screw spindle 215 in FIG. 7.

In the case of FIG. 2, the pressure meter 36 is adapted to give signals to the control unit 39 allowing the exact determination of the position of the plug body. At a relatively low pressure the plug body moves through the ring duct at a first considerably throttling position of valve 35. If the plug body is retained in a station, the pressure upstream thereof will rise and the distribution duct will open. This pressure rise or the subsequent short pressure drop on opening the distribution duct is used to mark the beginning of the measurement to control the time of stay of the plug body in the station and of the discharge of fluid.

By the concerning signal transmitted by pressure meter 36 to control unit 39, this unit will also adjust valve 35 at a lower resistance of flow, so that the pressure in the ring duct can maintain a level high enough to keep the said station open or even to open it and to distribute the desired amount of fluid per unit time at said station.

The plug body may remain retained in the station during a predetermined time interval, or the quantity of fluid discharged at the station is derived from the measured pressure in view of known resistance for each station. At the end of this period, the control unit 39 opens valve 34 in branch duct 38 to increase the pressure in the ring duct to cause the plug body to leave the station. This pressure should always be so much higher than the highest pressure for discharging fluid in a station, that there is no risk of the plug body untimely leaving a station.

In the case of FIG. 1, the flow meter 12 will start showing a drain flow c as soon as the plug body leaves a station. This indication, as soon as it surpasses a predetermined value, is used in the control unit 14 to switch the pump 13 to the condition for moving the plug body as described.

In FIG. 2, the fact that the plug body leaves a station is determined by the control unit on the basis of the indication by the pressure meter 36 showing a pressure drop immediately after the high pressure exerted to push the plug body from the station. This indication will be used by the control unit to close valve 34 and to adjust valve 35 to its position for moving the plug body.

Pressure meters and flow meters are to some extent interchangeable if the control unit is adapted adequately to the particular choice. Flow meters and pressure meters may also be used in combination.

Instead of or supplementary to the feeding of the control unit with information from flow and/or pressure meters, it may be fed with a measurement of the power taken up by the pump such as 13 in FIG. 1. At a constant voltage to the electric motor driving the pump, this amounts to a measurement of the electric current taken up thereby. This will be low when the plug body is moving through the ring duct. As soon as the plug body is retained in a station, this current will change and will thus give a reliable indication that the plug body is retained, and this may be used to switch the drive pump to a higher speed and power for opening the discharge duct(s) and for distributing fluid at the desired pressure, or, for measuring leakage, to raise the pressure in the main duct to the predetermined required pressure for the leakage measurement.

When the control unit emits a signal that the plug body should leave the station and continue its path to the next station, this signal switches the pump to a higher speed to raise the pressure to the desired level. The fact that the plug body has left the station is then determined by a drop in the power taken up by the pump owing to the rapid decrease of pressure in the ring duct, and an indication of this drop of power is used by the control unit to switch the pump back to the power level for moving the plug body at the desired speed.

The pump will have to be a flow pump such as a centrifugal pump. The power of the pump may be controlled in different ways. First of all its speed may be controlled either continuously within a certain range or in a limited number of speeds, e.g. three speeds, one for moving the plug body, the second one, a higher speed, for opening distribution ducts and for feeding them and a third, higher speed for pushing the plug body from a station. In case of only three such speeds, there is no possibility to feed one station with fluid at a speed of the pump different from the sped for other stations. This would only be possible if there are more fixed speeds instead of the said second one.

Another possibility is to control the power of the pump drive continuously or in steps allowing the pump to choose its own speed within a certain range depending on the fact whether the plug body is moving, is retained in a station or should leave a station.

The control unit etc. will now be described with reference to FIGS. 8, 9 and 10, FIG. 8 showing a control unit 460, FIG. 9 a programming unit 450 and FIG. 10 a combined unit.

In the case of FIG. 1, the flow meters 10 and 12 are connected to controller 423 by interface circuits 430 and 431. The pump drive 13 is connected to unit 423 by interface circuit 432. When the plug body is moving through the duct system the measuring signals from the meters are constantly compared with each other in unit 423. As soon as the difference is exceeding a predetermined threshold d, as is explained above, the pump drive 13 is activated through interface 432 to switch the pump into the distributing condition.

The memory 433 contains in a number of addresses corresponding to the number of retaining stations a number of values for quantities of fluid to be discharged one for each station. As soon as the plug body enters a station the said value for said station is read out of memory 433, addressed by means of a parallel load counter 424, and stored in a parallel load counter 425. During the retention time of the plug body in said station the controller 423 continuously calculates the difference between both flow meter readings and compares said calculated difference to the value read out of memory 433. As soon as the comparison shows equality the pump drive 13 is activated through interface 432 to switch to the conditon for pressing the plug body out of the retaining station. As soon as the reading of meter 12 shows that the plug body has left the station and is moving through the main duct, the unit 423 will switch pump 13 through interface 432 back to the condition for moving the plug body through the duct system and furthermore will increase the contents of counter 424 with 1 so that the next value in the memory 433 will be addressed when the plug body reaches the next station.

In case one pressure meter is used in the system, as is illustrated in FIG. 2, the other sections illustrated in FIG. 8 come into use. The memory 433 contains a number of addresses, each corresponding to one of the retaining stations, containing time values for each of said stations. Said memory 433 will be addressed by means of the parallel load counter 424. Information read from said memory 433 can be stored in a parallel-serial/shift register 434 and into a parallel load counter 425. Pressure meter 36 is now connected through interface conduit 430 to the controller 423 instead of flow meters 10 and 12, and both valves 34 and 35 (FIG. 2) are connected to an adapted interface circuit 432 in FIG. 8. As soon as the plug body enters a station the pressure meter 36 will deliver a corresponding pressure rise signal through interface 430 to the controller 423. In this case the controller 423 reads the contents of the memory 433 addressed by the contents of counter i.e. the retention time programmed for said retaining station, into the counter 425. The minutes generator 426 now receives a start instruction from the controller 423 and starts delivering 1 minute clock pulses to the delay counter 425, the contents of which is thereby stepped down to zero. When the zero state is reached, indicating the lapse of the retention time for said station, the controller activates the valve 34 through interface 432 to release the plug body from said station. Furthermore the contents of counter 424 is increased by 1 so that when the plug body reaches the next station the contents of the next address in the memory 433 indicating the retention time for the next station will be read.

If in case of FIG. 1 a pump drive is used resulting in a continuously adjustable distributing pressure a pressure meter in duct 9 could be added, connected to the controller 423 through a separate interface. It is now possible to use the memory 433 also to store pressure values indicating the preferred distributing pressure in the supply duct 9 for each of the retaining stations. As soon as the plug body enters a station indicated by the flow meter readings, the contents of the memory 433 addressed by the counter 424 will be read out into the counter 425.

In this case the addresses in the memory contain not only information about the quantity value for each station as mentioned above but also information about the preferred distributing pressure in the supply duct for said station. During the retention time of the plug body in said station the controller 423 continuously compares the measured pressure in duct 9 with the pressure value stored in one section of said counter 425 to adjust the pump drive 13 if necessary. Furthermore the controller 423 continuously calculates the difference of both flow meter readings and compares said calculated difference with the quantity value stored in the other section of counter 425. As soon as both values are equal the controller activates the pump drive 13 to press the plug body out of the station in the above described manner and also increases the contents of address counter by 1, so that the difference value and the pressure value in the next memory address will be read out when the plug body reaches the next station.

If, in case of FIG. 2, a continuously adjustable pump drive is used in stead of the two valves shown, a similar configuration as in the foregoing paragraph can be used. The memory now contains not only time values determining the retention time in each of said stations as described above referring to FIG. 2, but also contains pressure values determining the preferred pressure in the supply duct 9 when the plug body is retained in said station. As the plug body enters a station the addressed memory contents is read and stored in counter 425. The first section of said counter containing the pressure value remains unchanged during the retention times. Said pressure value will be compared in the controller with the measured pressure to adjust the pump drive 13 if necessary.

In case the power delivered to the pump drive will be measured and used as an indication for the fact that the plug body is moving through the duct, is retained in a station or is pressed out of a station; suitable measuring means for instance a current meter is connected through an interface to the controller 423. In that case the configuration of the control unit is similar to the configuration used in case only a pressure meter is used as indicating meter.

The programming unit 450 in FIG. 9 comprises the circuits necessary to read the contents of the memory in the control unit 460 in FIG. 8 and to write new retention time values or pressure values into indicated addresses in the memory. For programming purposes the unit 450 can be coupled to the unit 460 by means of the connectors 440 and 442 at the respective units. Both the delay unit and the programming unit are supplied from a suitable power source, for instance the electric mains or a battery.

By means of the address thumb wheel switches 400 and 401 an address is supplied and a memory location in the control unit is selected, whose contents have to become known. At the end of a delay period of ½ to 1 second after the setting of the thumb wheel switches, the number change detector 402 applies a trigger signal to the controller 403 in order to start a read cycle, by which through the connectors 440 and 442 a memory address is serially applied to the delay unit 460, which responds by transmitting back the corresponding memory contents (i.e. the stored delay time or pressure value). This information appears on the displays 404 and 405, leaving the information in the memory unchanged. If it is desired to change the information at the selected memory location the desired retention time or pressure value is set on the thumb wheel switches 406 and 407 and the write contact 408 is closed. During the subsequent write cycle the information at the relevant memory location is replaced by the newly selected retention time or pressure value. For data transmission purposes a parallel-series/series-parallel shift register 409/434 is used to convert eight parallel supplied bits into a serial information burst of eight bits vice versa. The input signals from the thumb wheel switches are supplied to a multiplexer 410, which converts the total of 16 input bits (4×4) into 2×4 output bits. The transmission clock signal is indirectly derived from the transmission oscillator 411. The entire unit is governed by the controller 403.

The control unit 460 has two operating modes:
1. a programming mode, during which the stored information in the memory can be read or new information can be stored with the aid of the programming unit;
2. a retention mode, during which control signals are generated to interface circuits 432 controlling the pressure generating means depending on the programmed retention times or pressure values.

In the programming mode the control unit 460 is coupled to the programming unit 450.

The data transmission from and to the control unit over lines 415a-b, 416a-b in connectors 440 and 442 is controlled by the programming unit 423 by means of the clock signal, the read/write signal and strobe signal (on lines 412-b, 413a-b, 414a-b). The controller 423 interprets the received information and supplies internal control signals.

It will be clear that the number of addresses in the memory 433 and the number of bits per address depends on the number of retaining stations in the duct system and on the number of digits necessary to express the delay time value or pressure value.

It will furthermore be clear that also a combination is possible in which the memory retention times as well as pressure values are stored, whereby the retention times determine the retention time of the plug body in each of the stations and the corresponding pressure values determine the pressure in the supply duct during the retention time of the plug body in said station.

It is further possible to design the interface circuits 430 and 431 for the respective meters 10 and 12 such that a possible deviation of the meter reading from a nominal specified reading could be substantially eliminated by adjusting the transmission characteristic of said interface circuits.

When the plug body leaves the last station on its way to the transfer station the address counter 424 has to be reset to address the memory location corresponding to the first delivery station after the transfer station. This can be realized by means of a feed back circuit automatically generating a reset signal if the count in said address counter has reached a predetermined maximum value corresponding to said last station, or separate reset means may be used, for instance detector elements detecting the passage of the plug body through the transfer station, or detecting the movement of a sliding block or other moving switching part such as 121 in FIG. 4 or 251 in FIG. 5.

In the preferred embodiment of FIG. 4, retaining station 116 comprising a radially narrowed section 137, the retaining of the plug body in said station will cause a pressure rise ot the maximum value because no fluid is delivered at said station, resulting in the release of said plug body, and said pressure rise may generate a reset pulse.

The division of the control unit into two separate subunits as illustrated in FIG. 8 and 9 is favourable in case a number of ring ducts is used, each ring duct comprising its own control unit 460, whereby only one programming unit is necessary for programming all said control units. However, if only one ring duct is used, the control unit and the programming unit can be combined into one combined unit as illustrated in FIG. 10.

Said control unit in FIG. 10 contains the thumb wheel switches 500, 501, 506 and 507 for setting the addresses and retention time values the number change detector 502, the controller 523, the address counter 524, the memory 533, the counter 525, the minutes generator 526, the solenoid drives 532, the meter interfaces 530 and 531, all with the same function as described for FIG. 9 and 10. The input-output-device 509 is replacing the multiplexer 410, the serial-parallel converter 409, the parallel-serial-converter 434 and the connectors 440 and 442 in FIG. 9 and 10. Because of the similarity with the system in FIGS. 8 and 9, the functioning of this system in FIG. 11 will be clear and will not be described in detail.

Although preferred embodiments of the invention are described it will be clear that many variations are possible within the scope of the invention. Among these is the use of an elongate plug body instead of a ball as shown in FIG. 3. The minute pulses referred to above for the control unit may of course be replaced by pulses of any other desired time interval.

I claim:
1. A duct system for a fluid which includes a main duct, a plug body within said main duct, means for supplying fluid to said main duct to create a predetermined pressure difference between the fluid pressure upstream of the plug body and the fluid pressure down- stream of the plug body, which predetermined pressure difference is sufficient to move said plug body through said main duct, mutually cooperating means for retaining the plug body in a number of subsequent positions in said duct in opposition to said predetermined pressure difference, and release means for temporarily increasing the pressure difference between the fluid pressure upstream of the plug body and the fluid pressure downstream of the plug body, which increased pressure difference is sufficiently greater than said predetermined pressure difference as to operate on said mutually cooperating means to release the retained plug body, the improvement which comprises control means responsive to retention of said plug body at a particular position for actuating said release means after a certain retention time of the plug body at said particular position, allowing the plug body to move to the next of said subsequent positions by the fluid.

2. A duct system according to claim 1, characterized in that the mutually cooperating means to retain the plug body comprise obstacle means in the duct at each of said subsequent positions to retain the plug body and radially compressible and expandable means on the plug body and/or in the duct, which means are in the expanded position when the plug body is retained by said obstacle means and which compressible and expandable means is forcedly temporarily compressed to let the plug body pass said obstacle means by said increased pressure difference in the duct exerting a force on the plug body to push the plug body from said retained position.

3. A duct system according to claim 2, characterized in that the obstacle means consist of duct sections with reduced diameter as compared with the diameter of the duct.

4. A duct system according to claim 2 or 3, characterized in that the plug body comprises or consists of a radially compressible elastic ball.

5. A duct system according to any of claims 1 to 3, characterized in that said means for supplying comprises a pump for delivering the fluid to the duct system and is provided with means to be operated in a first mode maintaining the fluid pressure into the duct system within such values that the plug body is able to move through the duct and will be stopped entering the next of said subsequent positions, whereafter the plug body is retained in that position, said means operating the pump in a second mode for delivering the fluid at such a pressure that said increased pressure difference to release the plug body from the retaining position is developed at the lapse of the retention time of the plug body in said position.

6. A duct system according to any of claims 1 to 3, characterized in that said release comprises means to open an additional supply of fluid under pressure to the duct.

7. A duct system according to any of claims 1 to 3, characterized in that said supplying means comprises throttling means in a supply of pressurized fluid to the duct to supply fluid at a lower pressure to the duct when the plug body has to be moved through the duct and at a higher pressure when the plug body is retained in one of said subsequent positions.

8. A duct system according to any of claims 1 to 3, characterized in that in the supply duct, supplying fluid to the main duct, measuring means are inserted to measure the pressure in said supply duct and/or the flow of the fluid through the supply duct, there being signal lines to feed the indication of such measuring means to said control means controlling the supply of fluid to the main duct.

9. A duct system according to claim 8, characterized in that the measuring means include a flow meter in the supply duct and a flow meter in a drain duct through which fluid is drained flowing from the main duct downstream of the plug body by the movement thereof.

10. A duct system according to any of claims 1 to 3, characterized in that there are measuring means for the power taken up by a pump supplying fluid to the main duct, such as, at a fixed voltage, the current of an electric motor driving the pump, said measuring means feeding its measurement to said control means to control the supply of fluid to the main duct.

11. A duct system according to any of claims 1 to 3, characterized in that a said control means comprises a programmed memory is used to determine the retention time of the plug body in each of said subsequent positions.

12. A duct system according to claim 11, characterized in that the programmed memory comprises a number of addressable memory positions loaded with retention time values corresponding each with one of said subsequent positions, and that the control system furthermore comprises an address-counter for addressing subsequent memory positions, whereby the retention time value read from each addressable position is used to control a timer circuit retaining the plug body in the concerning position during the assigned retention time read from said addressed memory position, whereby after the retention time the plug body is released from said position and the address counter is incremented to read the next retention time value.

13. A duct system according to claim 11, having means at a station where the plug body is in a retained position to open a discharge duct, to discharge fluid from the duct while the plug body is being retained, the quantity of fluid discharged at said station being derived from one or more of said measurements by said control system.

14. A duct system according to claim 11, characterized in that the programmed memory comprises a number of addressable memory positions loaded with discharge values corresponding each with one of said subsequent positions and each indicating the amount of fluid to be discharged at said corresponding subsequent positions, and the control system furthermore comprises an address counter for addressing subsequent memory positions, whereby the control system continuously calculates the amount of fluid delivered at the position in which the plug body is retained and compares said calculated value with the discharge value read from the memory for said position, whereby the plug body is released from said position when said calculated value and said discharge value are equal and the address counter is incremented to read the next discharge value.

15. A duct system according to claim 11 characterized in that a programming unit is installed as a separate device or combined with the control system for storing new retention time values or discharge quantity values into said memory or for changing such values.

16. A duct system according to claim 11 and characterized in that the end of the retention time of a plug body is sensed by sensing the decrease of the pressure difference between zones upstream and downstream of the plug body just after the rise of said pressure difference has loosened the plug body from its retained position.

17. A duct system according to any of claims 1 to 3, characterized in that the plug body after finishing its path through the main duct is taken up in a chamber of a moving part of a transfer station, which is provided with means to move this part to the upstream end of the main duct so that the said chamber is moved to direct communication with the supply duct, for fluid, under pressure, which thus pushes the plug body from said chamber into the upstream end of the main duct.

18. A duct system according to claim 17, characterized in that said transfer station is provided with pressure sensing means causing movement of said moving part by a rise in pressure upstream of the plug body as soon as this is retained in said chamber.

19. A duct system according to claim 18, characterized in that the plug body, when in the chamber, closes communication between the main duct through the chamber to a drain duct draining fluid from the duct downstream of the plug body while this moves through the main duct.

20. A duct system according to claim 18, characterized in that fluid connections cause feeding of said rise in pressure upstream of the plug body in the chamber to a valve, which thereby switches fluid connections so as to supply such fluid pressures to both sides of the moving part of the transfer station that this is moved.

21. A duct system according to claim 20, characterized in that the said valve is a differential piston valve with a connection for the fluid in the zone of the main duct where the plug body enters the transfer station to act on the larger piston surface and a connection for the fluid in the zone of the main duct where the plug body leaves the transfer station to act on the smaller piston surface, a retaining station in the main duct downstream of this latter connection retaining the plug body just after leaving the transfer station to cause a pressure rise upstream thereof to act on the valve through said connection.

22. A duct system according to claim 18 characterized in that fluid connections cause feeding of said rise in pressure upstream of the plug body in the chamber through throttling means to one side of the moving part of the station, that branch duct means, such as a groove in the wall of said moving part, cause communication between the fluid supply duct and said one side of the moving part before the moving part interrupts communication between said chamber and the main duct to cause continuation of movement of the moving part until the chamber reaches the position for communication with the supply duct and the upstream end of the main duct, and that the moving part is biassed by spring means or the like back to its original position.

23. A duct system according to claim 13, characterized in that a discharge duct for fluid a fluid operated valve for closing and opening said discharge duct is provided, said valve being operated by the fluid from the main duct to open when the pressure therein upstream of the plug body reaches a value higher than the pressure for moving the plug body through the duct.

24. A duct system according to claim 23, characterized in that the fluid operated valve has a diaphragm or the like with connections to have the fluid pressure in the main duct upstream of the retained plug body acting on one side thereof and the fluid pressure downstream of the plug body on the other side thereof.

25. A duct system according to claim 23, characterized in that the fluid operated valve has a connection to have the fluid pressure in the main duct downstream of the retained plug body act on the valve member in the direction to close the valve, the fluid pressure in the discharge duct itself acting on the valve member to open it against said pressure downstream of the plug body.

26. A duct system according to claim 23, characterized in that the valve in the discharge duct has means to adjust its maximum opening stroke.

27. A duct system according to claim 5 characterized in that the pump is operated at three speed modes, a first one for supplying the fluid to the main duct at first, lower pressure for moving the plug body through the duct, a second one for giving the fluid a higher pressure upstream of the plug body during the retention time of the plug body in one of said subsequent positions and at a third mode for giving the fluid a still higher pressure to release the retained plug body from a retained position.

28. A duct system according to claim 4, characterized in that said control means comprises a programmed memory is used to determine the retention time of the plug body in each of said subsequent positions.

29. A duct system according to claim 5, characterized in that said control means comprises a programmed memory is used to determine the retention time of the plug body in each of said subsequent positions.

30. A duct system according to claim 6, characterized in that said control means comprises a programmed memory is used to determine the retention time of the plug body in each of said subsequent positions.

31. A duct system according to claim 7, characterized in that said control means comprises a programmed memory is used to determine the retention time of the plug body in each of said subsequent positions.

32. A duct system according to claim 8, characterized in that said control means comprises a programmed memory is used to determine the retention time of the plug body in each of said subsequent positions.

33. A duct system according to claim 9, characterized in that said control means comprises a programmed memory is used to determine the retention time of the plug body in each of said subsequent positions.

34. A duct system according to claim 10, characterized in that said control means comprises a programmed memory is used to determine the retention time of the plug body in each of said subsequent positions.

35. A duct system according to claim 17, characterized in that said control means comprises a programmed memory is used to determine the retention time of the plug body in each of said subsequent positions.

36. A duct system according to claim 6 wherein said supply means is operated in three discharge pressure modes, a first one for supplying the fluid to the main duct at first, lower pressure for moving the plug body through the duct, a second one for giving the fluid a higher pressure upstream of the plug body during the retention time of the plug body in one of said subsequent positions and a third mode for giving the fluid a still higher pressure to release the retained plug body from a retained position.

37. A duct system as defined in claim 7 wherein said throttling means is operated in three throttle opening mode, a first one for supplying the fluid to the main duct at first, lower pressure for moving the plug body through the duct, a second one for giving the fluid a higher pressure upstream of the plug body during the retention time of the plug body in one of said subsequent positions and a third mode for giving the fluid a still higher pressure to release the retained plug body from a retained position.

* * * * *